US006428630B1

(12) United States Patent
Mor et al.

(10) Patent No.: US 6,428,630 B1
(45) Date of Patent: Aug. 6, 2002

(54) METHOD FOR COATING AND PROTECTING A SUBSTRATE

(75) Inventors: GianPaolo Mor, Brescia (IT); Mark F. Mosser, Perkiomenville, PA (US)

(73) Assignees: Sermatech International, Inc., Limerick, PA (US); Flame Spray S.p.A., Milan (IT)

( * ) Notice: Subject to any disclaimer, the term of this patent is extended or adjusted under 35 U.S.C. 154(b) by 0 days.

(21) Appl. No.: 09/573,264

(22) Filed: May 18, 2000

(51) Int. Cl.$^7$ .............................................. C23C 22/78
(52) U.S. Cl. .................... 148/254; 148/265; 148/273; 148/279; 427/305; 427/328; 427/405
(58) Field of Search ................................ 148/259, 265, 148/273, 279; 427/305, 328, 405

(56) References Cited

U.S. PATENT DOCUMENTS

| | | | |
|---|---|---|---|
| 3,248,251 A | 4/1966 | Allen | 106/286 |
| 3,869,293 A | 3/1975 | Brumbaugh | 106/14 |
| 3,956,531 A | 5/1976 | Church et al. | 427/226 |
| 4,310,574 A | 1/1982 | Deadmore et al. | 427/405 |
| 4,374,183 A | 2/1983 | Deadmore et al. | 428/641 |
| 4,500,364 A | 2/1985 | Krutenat | 148/6.14 R |
| 4,537,632 A | 8/1985 | Mosser | 106/14.12 |
| 4,606,967 A | 8/1986 | Mosser | 428/220 |
| 4,617,056 A | 10/1986 | Mosser et al. | 106/1.12 |
| 4,630,594 A | 12/1986 | Ellersick | 126/64 |
| 4,659,613 A | 4/1987 | Mosser et al. | 428/215 |
| 4,664,973 A | 5/1987 | Otfinoski | 428/307.3 |
| 4,863,516 A | 9/1989 | Mosser et al. | 106/14.12 |
| 4,869,936 A | 9/1989 | Moskowitz et al. | 427/423 |
| 5,019,429 A | 5/1991 | Moskowitz et al. | 427/422 |
| 5,024,884 A | 6/1991 | Otfinoski | 428/328 |
| 5,478,413 A | 12/1995 | Mosser et al. | 148/261 |
| 5,512,382 A | 4/1996 | Strangman | 428/632 |
| 5,650,235 A | 7/1997 | McMordie et al. | 428/610 |
| 5,652,064 A | 7/1997 | Mosser et al. | 428/472.3 |
| 5,660,886 A | 8/1997 | Peterman et al. | 427/376.6 |
| 5,716,720 A | 2/1998 | Murphy | 428/623 |
| 5,741,556 A | 4/1998 | Taylor et al. | 427/453 |
| 5,803,990 A | 9/1998 | Mosser et al. | 148/261 |
| 5,837,385 A | 11/1998 | Schaeffer et al. | 428/610 |
| 5,866,271 A | 2/1999 | Stueber et al. | 428/545 |
| 5,891,267 A | 4/1999 | Schaeffer et al. | 148/206 |
| 5,897,966 A | 4/1999 | Grossklaus, Jr. et al. | 428/652 |
| 5,922,409 A | 7/1999 | McMordie et al. | 427/383.7 |
| 5,958,522 A | 9/1999 | Nakagawa et al. | 427/456 |
| 5,975,852 A | 11/1999 | Nagaraj et al. | 416/241 R |
| 5,985,454 A | 11/1999 | McMordie et al. | 428/413 |

OTHER PUBLICATIONS

Katsuhiro Yamada, et al. "Application Of Thermal Spray Coating To Boiler Tubes In Refuse Incineration Plants", Abstract and Publication (English Translation of Abstract and Figure Legends Only) (No date).

Lai, *High–Temperature Corrosion Of Engineering Alloys*, ASM International, Nov. 1990.
Thermal Spray Technology Glossary, ASM International, National Thermal Spray Conference and Exposition 1996 & Materials Week Conference and Exposition 1996, Oct. 1996.
Gustafsson et al., *Thermally Sprayed Coatings for Boiler Protection*, Fluidized Bed Combustion—vol. 1 ASME 1995. (No month data available).
Kawahara et al., *Corrosion Prevention of Waterwall Tube by Field Metal Spraying in Municipal Waste Incineration Plants*, vol. 53, No. 3, pp. 241–251, 1997 (no month date available).
Kawahara, *Development and application of high–temperature corrosion–resistant materials and coatings for advanced waste–to–energy plants*, Materials High Temperatures 1997, pp. 191–199 (no month data available).
Abstract, Wilson et al., Experience of Composite Tubes in Municipal Waste Incinerators, Paper No. 153, 1997 (no month data available).
Yamada et al., *Application of Thermal Spray Coating to Boiler Tubes in Refuse Incineration Plants*, Proceedings of ITSC'95, Kobe (May 1995).
Abstract, A. Moreau, *Corrosion–Erosion and Protection Techniques in Furnaces for the Incineration of Household Refuse*, pp. 139–159 (No date available).
Steinmetz et al., *Corrosion of Metallic Materials in Waste Incinerators*, Materials Science Forum vols. 251–254 (1997) pp. 505–518 (No month data available).
Garbage in, Energy out, Nickel, Sep. 1999, vol. 15, No. 1, pp. 10–11.
Abstract, Soutrel et al., *Corrosion of Fe, Ni, Cr And Their Alloys in Simulated Municipal Waste Incineraion Conditions*, Paper No. 428, 1998 (No month data available).
Abstract, Kawahara et al., *Corrosion Factors Of Waterwall Tube And Protection By Field Metal Spraying In Municipal Refuse Incineration Plant*, Paper No. 563, 1995 (No month data available).
Abstract, Schroer et al., *Corrosion resistant coating materials for heat exchanger tubes in waste incineration plants* (No date available).
Krause et al., *Boiler Tube Failures In Municipal Waste–to–Energy Plants*, Environmental Effects (No date available).

*Primary Examiner*—John Sheehan
*Assistant Examiner*—Andrew L. Oltmans
(74) *Attorney, Agent, or Firm*—Drinker Biddle & Reath LLP

(57) ABSTRACT

A method of coating a substrate is provided. A metallic layer comprising at least about 8% nickel is deposited by thermal spraying on a substrate. The metallic layer has an average density greater than about 80%. A slurry layer comprising from about 10% to about 90% aluminum or alloy thereof is deposited on the metallic layer. Heating to a temperature in excess of 500° C. (932° F.) results in the formation of an intermetallic layer of NiAl. The resulting coating is particularly suited for protecting the surfaces of incinerators or other combustion chambers.

15 Claims, No Drawings

METHOD FOR COATING AND PROTECTING A SUBSTRATE

FIELD OF THE INVENTION

The present invention relates to the field of protective coatings, specifically, to the method of depositing a multi-layer coating having improved properties, which can be easily applied and repaired.

BACKGROUND OF THE INVENTION

Modern waste incinerators burn waste to avoid the need to store waste in landfills, and to produce energy. The walls of incinerator combustion chambers (combustion zones or incinerator areas) are subject to extremely harsh conditions, including exposure to extreme heat, noxious gases, and corrosive chemical compounds which are the by-products of combustion.

Incinerators burn, for example, garbage, biomass and biological waste. Combustion of these materials produces $CO_2$ and $H_2O$ vapor, plus acid gases, HCl, $NO_x$ (where $NO_x$ is any of a series of oxides or nitrogen) and $SO_x$ (where $SO_x$ is $SO_2$ or $SO_3$). Combustion of plastics, such as polytetrafluoroethylene (PTFE), polyvinyl chloride (PVC), polyvinylidene chloride ($PV_2C$), etc., can produces free halides and hydrogen halide gases. All of these are highly corrosive.

In addition to the combustion of incinerator waste, impure fuels are used as the combustion means in incinerators of all types. Such fuels include, for example, high sulfur coal, lignite, plant matter and asphalt and tar products such as orimulsion. These fuels also produce acidic gases such as $NO_x$ and $SO_x$, which can cause corrosion and oxidation of the incinerator surface in the combustion zone.

Molten ash is produced by complex low melting point salts. This molten ash rapidly attacks steel.

All of these products of waste combustion create an extremely harsh environment, causing extensive corrosion and oxidation of exposed incinerator surfaces. It has been found that in some cases an uncoated carbon steel surface lasts only approximately 12 months in this environment.

Accordingly, there exists a significant need to protect surfaces, exposed to such a corrosive and oxidizing environment, such as those found in an incinerator.

The need to protect the exposed surfaces of incinerators from corrosion and oxidation in modern waste management plants must be balanced with the goal of extracting energy from the combustion process. The steam generated from the utilization of the heat of combustion can be used for home heating, industrial use, or to produce power via turbine driven generators. Thus, modern waste management plants are referred to as "waste-to-energy" plants.

Corrosion can be controlled by decreasing the heat acting on the incinerator walls by using, for example, refractory coatings, or by cooling the incinerator walls with water. However, this loss of heat results in a proportional loss of energy. If cooling is used as the means of corrosion prevention, the water-to-energy transformation is detrimentally compromised.

The combustion zone of an incinerator is typically formed from steel. Some incinerator combustion zones are formed from steel tubes. The life of an incinerator is measured in wall thickness, expressed in millimeters (mm) or mils (thousandths of an inch), lost per year as the steel is corroded and oxidized. Absent any protective coating on the steel surface, corrosion and oxidation occur rapidly.

Various solutions have been proposed to address the corrosion and oxidation problems faced by incinerators operators, each having its drawbacks:

(a) Nickel Based Superalloy Tubes.

One proposed solution to the problem of corrosion and oxidation in incinerators is to fabricate an entire incinerator from specially formulated nickel based superalloys. The proposed nickel based superalloys usually contain significant percentages of Cr and Mo, and are extremely expensive.

In addition to the prohibitive cost of using such superalloys, this solution does not address the need to provide corrosion and oxidation protection to preexisting facilities, short of rebuilding the entire facility.

While nickel based superalloys display effective corrosion resistance, they may still need to be replaced, in time. Moreover, if there is wall failure in a nickel based superalloy structure, there exists no simple, effective and cost effective method of repairing the wall.

(b) Composite or Coextruded Tubes.

Composite or coextruded tubes are produced by coextrusion of two component tubes metallurgically bonded together during the coextrusion process.

Composite tubes are high in cost. In addition, where the two components of a composite tube differ in their coefficient of thermal expansion, cracking can occur due to temperature changes.

Repair of composite tubes is difficult, and may require total replacement of the tubes.

(c) Weld Overlay of Steel Tubes with Nickel Alloy.

One proposed solution to the problems of corrosion and oxidation of incinerator walls is welding nickel alloy overlays over damaged portions of steel or steel tubes. This process is expensive, and requires welding equipment.

Weld overlays cannot conform to irregularly shaped surfaces, such as where two adjacent incinerator tubes are joined. Weld overlays leave gaps where tube surfaces can still be attacked.

In addition, the process of welding is highly stressful on the underlying structure. The welding process can thus further damage or crack previously damaged or weakened tubes.

(d) Thermal Spraying Techniques.

Thermal spray coating processes are often employed in order to protect surfaces which are exposed to extremely hostile conditions, such as environments exposed to high temperatures or noxious substances. Thermal spray coating processes are used in a variety of industries. A benefit of thermal spray coating is that an inexpensive base metal, such as carbon steel, can be treated on its surface, creating new surface properties that are far superior to that of the base metal. In this way, thermal spray coatings save costs associated with fabrication of entire structures from prohibitively expensive superalloys.

Currently, thermal spray coating processes exist which must be performed under tightly controlled conditions, such as at a manufacturing plant or laboratory, and must invariably be applied under ideal conditions. Accordingly, these known thermal spray coating processes are often applied to surfaces in controlled booths or cabins using robotic techniques. In some cases inert shrouding is used or even vacuum chambers. These coating processes are performed on discrete, pre-assembled component parts. The use of controlled conditions reduces the number of variables that effect the quality of the coating. Because these spray coating processes must be performed under ideal conditions, they are not practical where a thermal spray coating must be applied to an existing surface in situ.

Thermal spray coating processes fall under the following general categories, listed from lowest cost, least dense, and lowest perceived quality coating, to highest cost, most dense and highest quality coating:

(1) Combustion powder/wire ("Flame spraying"). Combustion flame spraying employs compressed air or oxygen, mixed with one of a variety of fuels (e.g., acetylene, propylene, propane, hydrogen), to both melt and propel the molten metal particles. Generally, the process yields low density coatings. Combustion flame spraying uses either powder, wire or rod as the feedstock material and has found widespread usage around the world for its relative simplicity and cost effectiveness. Combustion flame spraying provides for a thermal coating having a density range of approximately 85–90%.

(2) Arc wire. Arc wire spraying involves two current-carrying electrically conductive wires fed into a common arc point at which melting occurs. A high-velocity air jet blowing from behind the moving wires strips away the molten metal which continuously forms as the wires are melted by the electric arc. Arc wire spraying provides for a thermal coating having a density range of approximately 80–95%.

(3) Plasma spray. A plasma gun operates on direct current, which sustains a stable non-transferred electric arc between a cathode and an annular anode. A plasma gas is introduced at the back of the plasma gun interior, the gas exiting out of the front of the anode nozzle. The electric arc from the cathode to the anode completes the circuit, forming an exiting plasma flame. The powder to be processed is introduced at this hottest part of the flame. Plasma spray is used to form deposits of greater than 50 micrometers of a wide range of industrial materials, including nickel and ferrous alloys, refractory ceramics, such as aluminum oxide and zirconia-based ceramics. Plasma spraying provides for a thermal coating having a density range of approximately 90–95%.

(4) High Velocity Oxyfuel Spraying (HVOF). This technique is based on special torch designs, in which a compressed flame undergoes free-expansion upon exiting the torch nozzle, thereby experiencing dramatic gas acceleration, to supersonic speeds. By properly injecting the feedstock powder from the rear of the torch, and concentrically with the flame, the particles are also subjected to velocities so high that they will achieve supersonic values. Upon impact onto the substrate, the particles spread out very thinly, and bond well to the substrate and to all other splats in its vicinity, yielding a well adhered, dense coating. HVOF spraying provides for a thermal coating having a density range of approximately greater than 95%.

(5) Shrouded HVOF. HVOF spraying carried out with a gaseous and/or mechanical or physical barrier placed around the spraying process designed to reduce the ingress of air into the system and so reduce oxidation of the of the particles being sprayed. Gas and particle velocity are significantly increased within the reduced pressure chamber. This yields a higher density deposit. Shrouded HVOF spraying provides for a thermal coating having a density range of approximately greater than 95%.

Proceeding from thermal spray processes (1) through (5) listed above, as the velocity of the molten particles increases, the cost of the process doubles or triples. Thus, while it would be ideal to always employ the highest velocity and highest density coating, it is not always practicable. Extremely dense coatings can be very stressed, as they have strong interconnected bonding. Cohesive forces within the particles of the coating can be greater than adhesive forces holding the coating to a substrate, and the coating may de-bond, i.e., pull away from a substrate.

Moreover, the highest quality processes, plasma spray and HVOF, produce coatings with the expected quality only when performed under tightly controlled conditions, such as at a manufacturing plant or in the laboratory, as discussed herein.

Another factor impacting thermal spray coating quality is the geometry of the substrate. High powered thermal spray processes, such as plasma spray or HVOF, produce high quality, dense coatings only when the thermal spray stream impacts the surface of the substrate at a substantially perpendicular angle. Such deposition angles are normally not possible in incinerators, which have irregularly shaped surfaces at fillets, heat exchangers, or welded areas around incinerator tubes.

In addition to fabrication issues, access to the surfaces of the inner walls of incinerators is greatly limited by space constraints. The equipment necessary for applying thermal spray coating is cumbersome, and difficult to position inside the plenum of an incinerator. The upper reaches of the walls of an incinerator can only be reached by being positioned on scaffolding. Most high-powered thermal spray coating equipment is too dangerous to be used in such a manner. In addition, high-powered thermal spray coating equipment produces vibrations. These vibrations could be hazardous if such equipment were employed in an enclosed or difficult to reach space.

A coating process which could be easily repaired, would be extremely useful in any situation where a metal is being exposed to a highly corrosive environment to which it is difficult to gain access.

While highly protective, thermal spray coatings do show signs of corrosion and erosion after exposure to harsh conditions. There presently exists no routine and cost effective method of repairing damaged or worn thermal spray coatings, short of stripping the damaged coating and re-applying a completely new coating to a surface. This process is expensive and time consuming. In addition, an operating facility where a new thermal spray coating must be applied may have to be shut down for an extended period of time during the re-application process.

An ideal thermal spray coating deposit has a density which approaches the density of a solid metal structure having the same composition as the composition being thermally sprayed. Thus, density of a coating, as used in the thermal spray coating arts and the herein specification, refers to the ratio of the measured density of the coating to the absolute density of a perfectly solid material of the same composition, expressed as a percentage.

A significant and inescapable drawback of thermal spray coating processes is the formation of porosity or voids in the coating, leading inevitably to coating densities below 100% (i.e., coating densities which are less than the density of the corresponding solid material of the same composition). Porosity is the largest source of coating failure.

As droplets or particles from the thermal spray coating process, known as "splats," impact a substrate, the splats form layers. Pores or voids form between these layers, or between individual splats.

Porosity can originate from, inter alia, any of the following events in the coating process: material shrinkage on cooling from the liquid state; trapped, unmelted or partially melted particles, which form voids between adjacent to particles; voids that remain unfilled by the splats; poor intra-splat cohesion; and, separation of splats.

Notably, pores can form interconnected channels which reach directly from a coating's outer surface to the underlying substrate, allowing corroding or oxidizing gas molecules, for example, to attack the base metal. Porosity can thus destroy a coating's desired corrosion resistance.

Accordingly, there is a need for a thermal spray coating process which solves the problems of porosity associated with known spray coating processes. There is also a need for a thermal spray coating process which results in a coating having enhanced corrosion and oxidation resistance.

Aluminide coatings comprise one group of protective coatings which provide corrosion and oxidation resistance. Aluminide coatings are based on intermetallic compounds formed when nickel, in a nickel-based superalloy, for example, reacts with aluminum deposited at a substrate's surface to form an aluminum-rich phase such as nickel aluminide (NiAl). NiAl has exceptional corrosion-resistant properties, and is stable and non-reactive. Accordingly, NiAl is desirable as a coating for any surface in a harsh environment.

Accordingly, it is an object of the invention to provide a coating on a substrate which can form an improved protective aluminide layer.

It is also an object of the invention to provide a coating which can be easily repaired.

SUMMARY OF THE INVENTION

The present invention generally provides a method of applying a coating to a substrate, which meets the needs outlined above. A metallic layer is deposited onto the substrate by thermal spraying. The metallic layer comprises at least about 8% nickel by weight. The deposited metallic layer has an average density of greater than about 80%. A slurry layer is deposited onto the metallic layer. The slurry layer comprises one or more diffusable aluminum-containing metallic pigments, and one or more inorganic liquid binders. The slurry layer comprises from about 10% to about 90% aluminum and/or aluminum alloy by weight.

The invention is also directed to a multilayer coating on a substrate, deposited according to the above-described process.

According to another embodiment, a method of repairing a nickel-containing metallic layer which has been deposited by thermal spraying is provided. The metallic layer comprises at least about 8% nickel by weight. The deposited metallic layer has an average density of greater than about 80%. A slurry layer is deposited onto the metallic layer. The slurry layer comprises one or more diffusable aluminum-containing metallic pigments, and one or more inorganic liquid binders. The slurry layer comprises from about 10% to about 90% aluminum and/or aluminum alloy by weight.

DETAILED DESCRIPTION OF THE INVENTION

The method of the invention generally comprises first depositing onto a substrate, by thermal spray coating, a metallic layer comprising at least about 8% nickel (Ni) by weight. The metallic layer is deposited to a predetermined thickness which is effective to coat the substrate. The metallic layer may be deposited by any known thermal spray coating technique. The least expensive and uncomplicated thermal spray coating processes, such as combustion wire spraying (flame spraying), are preferred.

A slurry layer is then formed on the metallic layer by any suitable method including spraying, rolling or brush painting a slurry layer onto the metallic layer. The slurry layer comprises an inorganic liquid binder, and an aluminum-containing metallic pigment. The slurry provides an additional coating on the thermal spray deposited metallic layer, and soaks into and fills the pores present in the thermally sprayed metallic layer.

The coating of the invention may be applied to a surface which is subject to a high temperature environment, such as the surface inside a waste incinerator. Where the coating provided is applied to an incinerator surface subject to temperatures below approximately 450° C. (842° F.), the coating functions to reduce corrosion and oxidation of the underlying substrate. At temperatures below about 450° C. (842° F.), the metallic layer and slurry layer remain intact as distinct layers on the substrate.

At temperatures greater than approximately 450–500° C. (842–932° F.), aluminum from the slurry diffuses into the metallic layer, reacting with the Ni in the metallic layer, and forming an intermetallic layer composed of NiAl at the surface of the metallic layer. As described herein, NiAl possesses highly desirable properties, and provides additional protection for the substrate at high temperatures.

The method of the present invention is generally applicable to any surface which will be subjected to extreme temperatures or corrosive substances. The present invention provides a relatively simple to apply and cost-effective method, which provides for a coating can be easily repaired in situ.

It is desirable that the metallic layer have a high density, and thus a low porosity. However, one of the favorable features of the invention is that the metallic layer can be deposited using the least expensive, and lower density, thermal spray coating processes, such as flame spraying and arc wire. The more expensive thermal spray coating processes such as plasma spraying and HVOF, need not be employed, because the present invention provides for a solution to the problem of porosity in thermal spray coatings.

The coating method of the present invention may be applied to any substrate which would benefit from protection from adverse temperature, chemical or environmental conditions. In particular, the substrate may take the form of a wall such as the interior wall of an incinerator exposed to extreme heat and combustion products, known as the "fireside wall." It should be appreciated that the process of the present invention can be applied to, and is useful on, any substrate that will be exposed to a similar harsh environment.

The thermal spray-deposited layer should be comprised of at least about 8% Ni by weight. It is contemplated that those skilled in the art would appreciate the existing nickel-containing thermal spray coatings which can be utilized as the metallic layer. Corrosion resistant superalloy coatings containing Ni are particularly suitable materials to be used for forming the metallic layer, so long as the selected alloys have a Ni content of at least about 8% Ni by weight.

According to a preferred embodiment of the present invention, the metallic layer also comprises at least about 12% chromium by weight. Chromium is known to have desirable corrosion and oxidation resistant properties, and has been incorporated into the formulation of various superalloys.

Acceptable superalloy thermal spray coatings include, for example, the following commercially available superalloys:

| Superalloy | % Ni by weight | % Cr by weight |
|---|---|---|
| Haynes ® 188 | 20–24 | 20–24 |
| Incoloy ™ 825 | 38–46 | 19.5–23.5 |

-continued

| Superalloy | % Ni by weight | % Cr by weight |
|---|---|---|
| Hastelloy ® X | 47 | 22 |
| Hastelloy ® C 276 | 55 | 14.5–16.5 |
| Inconel 718 | 50–55 | 17–21 |
| Inconel 625 | 58 | 20–23 |
| Nichrome | 80 | 20 |

The above-listed superalloys are available under the indicated trade names, and other trade names. Other superalloys containing at least about 8% Ni by weight and at least about 12% Cr by weight are known to those skilled in the art, and may be selected for the practice of the present invention.

Thermal spray coatings have been combined with slurry mixtures to form abradable seals. These seals are applied to turbomachinery to maintain clearances between spinning blades and surrounding structure. For example, U.S. Pat. No. 5,024,884 to Otfinoski discloses such an abradable seal. An abradable seal must fragment and disappear when contacted by rotating parts which are spinning at high speeds. Thus, a thermal spray coating layer, if used for an abradable seal, must have a density when deposited of approximately between 12–40%, as described in Otfinoski and the abradable seal patents cited therein. At that density, the abradable seal will fragment and degrade when contacted.

Unlike an abradable seal, the metallic layer of the present invention must not fragment or disappear, even under extremely harsh conditions. Accordingly, the metallic layer of the present invention should be deposited to an average density generally greater than about 80%, corresponding to a porosity of no greater than about 20%, in order to perform effectively as a barrier to corrosion and oxidation. Abradable seals cannot be used as effective coating to prevent corrosion or oxidation.

One advantage of the present invention is that, once the metallic layer is deposited by thermal spraying, no special treatment, such as sanding or buffing, need be performed to prepare the metallic layer. The metallic layer may remain substantially rough, without having a detrimental effect on the coating process described herein. The metallic layer is deposited by thermal spraying until a preselected thickness has been deposited. The metallic layer should be deposited to a thickness in the range of about 150–1600 $\mu$m.

The selected thickness for the metallic layer will vary depending on the thermal spray process and equipment chosen for depositing the metallic layer. For combustion flame spraying, the metallic layer should be deposited to a thickness of about 200–600 $\mu$m, for example. The selected thickness will also depend on the ultimate use and environment of the substrate.

Once the metallic layer is properly deposited, a slurry layer is deposited over the metallic layer, by either spraying, rolling, brush painting, or any similar method. Another significant advantage of the present invention, is that the step of depositing the slurry layer can be performed in a simple and economical manner, using inexpensive tools. The slurry layer need not be deposited with exacting precision. Thus, the process of the present invention can be easily practiced in spaces which are difficult or uncomfortable to reach, such as the interior of an incinerator. The slurry layer is also easily applied to irregularly shaped surfaces, such as fillets or welded areas around incinerator tubes.

The slurry layer comprises an inorganic liquid binder and a metallic pigment. The inorganic liquid binder which should not be fugitive or decompose under the harsh conditions to which it will be exposed. Binders which are appropriate for use as components of the slurry layer include, but are not limited to, the following:

(1) acid phosphate/dichromates or acid phosphate/molybdates;
(2) acid phosphates, such as the acid phosphates exemplified by U.S. Pat. No. 5,478,413 to Mosser et al., the entire disclosure of which is incorporated herein by reference;
(3) alkali silicates;
(4) lithium polysilicates;
(5) quaternary silicates;
(6) colloidal silica;
(7) alkyl silicates;
(8) siloxanes.

Examples of acid phosphate/dichromate or acid phosphate/molybdate types of slurries are provided in U.S. Pat. No. 3,248,251 to Allen, described above, the entire disclosure of which is incorporated herein by reference. Allen describes coating compositions consisting essentially of a slurry of solid inorganic particulate pigment material (such as aluminum) in an aqueous acidic bonding solution containing dissolved metal chromate, dichromate or molybdate, and phosphate. These "Allen" coatings have been and still are successfully used to provide high quality coatings which protect ferrous metal alloy surfaces from oxidation and corrosion, particularly at high temperatures.

Alkali silicates are solutions of sodium and potassium silicates with various $M_2O/SiO_2$ ratios where M is sodium or potassium. These solutions are alkaline and can air set and air cure, often without heating.

Lithium polysilicates are similar to alkali silicates, but behave more like colloidal silica. These binders will also cure in air.

Quaternary silicates have the formula $R_4N^+SiO_3^-$, where R is typically a short chain alkyl group. These binders set or cure to $SiO_2$ coatings.

Alkyl silicates such as tetraethyl orthosilicate can be used. These are tetraethoxysilanes which hydrolyze to form hydrated silicas.

Siloxanes (silicones) may also be used as binders. The organic portion of the siloxane chain decomposes at varying temperatures above about 200° C., leaving $SiO_2$ "backbones".

Each of the above-listed binders possesses the characteristics necessary for proper performance in the present invention. Each binder allows entrained pigments to diffuse into the metallic layer when the temperature reaches about 500° C. (932° F.).

The metallic pigment comprises aluminum, typically in a powder form. Atomized aluminum powder is commonly used as a component in slurries. Particle size is not critical to the performance of the aluminum powder as used in the disclosed invention.

Aluminum alloy powders can also be used. An example of an aluminum alloy is an 88/12 aluminum/silicon (eutectic) powder. Additions of silicon (elemental) are desirable up to about 20% of the aluminum content. By "aluminum-containing metallic pigments" is meant a metallic pigment which comprises aluminum and/or an aluminum alloy.

The amount of aluminum as the metallic pigment in the slurry layer, in either powder form or as an aluminum alloy, may range from about 10% to about 90% by weight of the total slurry layer content (weight of the metallic pigment plus the weight of the inorganic liquid binder), and is preferably in the range of about 40% to about 80% by weight. The range is more preferably from about 55% to about 70%, most preferably from about 58% to about 62%.

The thickness of the slurry layer can be adjusted to accommodate slurries having varying amounts of aluminum. In the case of slurries having a lower concentration of aluminum (for example 10% aluminum), a thicker slurry layer would be required to provide an adequately protective coating, and to provide an amount of aluminum necessary for forming an intermetallic layer of NiAl at higher temperatures, as described. The thickness of the slurry layer should preferably be at least 25 microns (1 mil), more preferably from about 50 to about 200 microns (2–8 mils), most preferably from about 75 to about 150 microns (3–6 mils).

The aluminum in the slurry layer should be diffusable, that is, capable of diffusing into the pores of the metallic layer and reacting with the Ni of the metallic layer at high temperatures, for example, at temperatures greater than approximately 500° C. (932° F.), in order to form an intermetallic layer of NiAl.

Examples of slurries suitable for use in the present invention containing aluminum powder include: the various slurries prepared according to U.S. Pat. No. 3,248,251 to Allen, particularly examples 2, 3, 7, 9, 10,12, and 14 thereof; the slurries described in U.S. Pat. No. 3,869,293 (Brumbaugh), which contain an Al/Mg metallic pigment; the slurries of U.S. Pat. Nos. 4,537,632 and 4,606,967, which contain spherical aluminum powder; and the slurries of U.S. Pat. No. 4,617,056 (Mosser et al.), U.S. Pat. No. 4,659,613 (Mosser et al.) and U.S. Pat. No. 4,863,516 (Mosser et al.), all containing atomized and/or flake aluminum compositions. The disclosures of the aforementioned patents are all incorporated herein by reference in their entireties.

It is also contemplated that a chromate-free slurry can form the slurry layer of the present invention. Suitable chromate-free slurries are described in U.S. Pat. No. 5,478,413 (Mosser et al.), U.S. Pat. No. 5,652,064 (Mosser et al.) and U.S. Pat. No. 5,803,990 (Mosser et al.), the entire disclosures of which are incorporated herein by reference.

The slurry layer is deposited over the rough porous thermal-sprayed metallic layer. Part of the binder liquid is absorbed into the pores of the metallic layer. The binder will form a phosphate or a silica once the slurry layer is deposited onto the metallic layer, depending on the formulation of the binder used. Both phosphates and silicas bond to oxidized metal surfaces, which are normally found in thermal spray coatings. The cured slurry coating creates a smooth surface layer further decreasing reaction and fouling.

It is well known in the art that aluminum-containing slurries such as those described in U.S. Pat. No. 3,248,251 to Allen, can be cured by heating, causing the slurries to lose water. The cured slurry is typically water-insoluble. Aluminum-containing slurries can be cured by heating to temperatures of about 300–350° C. (572–662° F.) for about 1 hour; 250° C. (482° F.) for about 4 hours; or, 190° C. (374° F.) for about 20 hours. As noted herein, slurries containing alkali silicates and lithium polysilicates can air set, without the need for heat curing.

However, it is not a requirement of the present invention that the slurry layer must be cured by a separate heating step. The slurry layer of the invention will typically be deposited in an environment subjected to extreme heat, such as the combustion zone of an incinerator. It is desirable that the slurry layer be deposited in a low humidity environment to keep the slurry from rewetting during the deposition process. Once the slurry layer is deposited, the incinerator can be placed into operation, and the high temperature of the incinerator operation will rapidly cure the slurry.

Due to the porosity of thermal spray coatings, described above, the deposited metallic layer acts as a sponge, which absorbs the slurry layer into the pores. Thus, aluminum from the slurry flows into and fills the pores of the metallic layer. This creates a coating which does not suffer from the porosity problems ordinarily associated with the application of thermal spray coatings.

Significantly, the composition formed by the process of the present invention provides a remarkable coating when used in a high temperature environment. At higher temperatures, above approximately 500° C. (932° F.), it is believed that aluminum from the slurry will begin diffusing into the thermal spray coating, forming a diffusion (intermetallic) layer of NiAl.

The NiAl intermetallic phase will form when the aluminum in the slurry layer diffuses into the nickel in the metallic layer. The NiAl structure may be hypostoichiometric or hyperstoichiometric, but will retain the NiAl structure. As noted, aluminides such as NiAl are resistant to high temperature degradation and therefore are preferred as protective coatings.

The NiAl diffusion layer formed at high temperatures has exceptional corrosion-resistant properties. It is continuous, is stable, non-reactive and has a very high melting point. The NiAl alloy formed is extremely hard and thermodynamically stable, which is an important advantage in a harsh environment. In addition, the NiAl diffusion layer resists oxidation and hot corrosion forming an adherent protective scale. As discussed below, it has been found that the NiAl will not be wet by flying molten ash.

The process of the present invention is described herein by a coating applied to fireside wall in an incinerator. However, it should be appreciated that the process is not so limited in its application, but may find use in any industry where surfaces may be exposed to extreme temperatures and noxious substances.

The process of the present invention may also be used to repair a previously deposited thermal spray coating layer. If a thermal spray coating layer meeting the requirements of the metallic layer of the present invention has been previously deposited onto a substrate, a slurry layer as described herein can be deposited over the previously deposited layer. This provides for the formation of the improved multilayer coating of the invention.

If a previously deposited thermal spray coating shows signs of damage, such as cracking or disbonding, the coating can be repaired by depositing additional thermal spray coating only to the damaged areas. A slurry layer can then be deposited on top of the repaired thermal spray coating. Thus, it is not necessary to completely recoat an entire incinerator, as had been previously required when using thermal spray coating techniques alone. According to this embodiment of the invention, a previously deposited thermal spray coating metallic layer can be repaired in an easy and cost effective manner, never before appreciated.

The following non-limiting examples are intended to illustrate the practice of the invention. The examples are based upon incinerators coated according to the present invention:

EXAMPLE 1

The process of coating a surface in accordance with the present invention was practiced on a moving grate waste incinerator. The incinerator contained a moving grate, which is heated by a natural gas flame. Waste is injected onto the moving grate and burned. The burning capacity of the plant was 250,000 kg/day of commercial and household waste.

alloy thermal spray coating used was IN625. The chemical composition of IN625 is:

| Ni | Nb | Mo | Co | Cr | Al | P | Ti | S | Si | C | Mn | Fe |
|---|---|---|---|---|---|---|---|---|---|---|---|---|
| 58% | 3.15–4.15% | 8–10% | 1% | 20–23% | 0.4% | 0.015% | 0.4% | 0.015% | 0.5% | 0.1% | 0.5% | 5% |

The presence of vinyl plastics and other chlorinated materials produces HCl gas and chlorine ($Cl_2$), along with $SO_x$ and $NO_x$ gases. Refrigeration materials containing fluorine in various forms can also be found. Combustion of these gases produces HF gas. Significant amounts of molten ash are also produced. Accordingly, the surface of the incinerator wall which is exposed to hot gases and ash faces a particularly harsh environment, with severe corrosion problems.

An incinerator of this type, if left uncoated, loses on average from 0.5 to 0.7 mm/year (0.019–0.028 inches/year) of wall thickness due to corrosion.

The incinerator fire wall had a scalloped design, since the walls were formed from stacked steel vertical tubes which carried water as a heat exchange medium. Energy is recovered from the incinerator combustion chamber through heat exchange with the water in the tubes. This arrangement is known as a "waterwall". Each scalloped tube section of the waterwall was approximately 100 mm (4 inches) in diameter. The tube sections were joined by welds. Thus, the surfaces which required coating had an irregular shape, as is the case with many existing incinerators. Existing thermal spray coating techniques, which are most effective under ideal conditions, such as when coating planar surfaces, are impractical and ineffective in this environment.

The waterwall extended approximately 15 m (49.2 feet) from the base of the unit. This wall was 7 m (23 feet) wide. Part of the overhead wall included a tube structure extending 3.5 m (11.5 feet). The area affected by corrosion attack is the upper 8 m (26.3 feet) of the waterwall, as well as the overhead wall. It is necessary for a worker to stand on scaffolding in order to apply a coating to the upper portions of the wall. This is not possible using thermal spraying machinery operating at high vibration or noise levels.

The corrosion rate is most significant at the top of the structure, and decreases from the top to the bottom. In the critical area, the fume temperatures average approximately 950° C. (1742° F.) and the water temperature in the tubes reaches 280° C. (536° F.).

The tubes forming the waterwall were formed from carbon steel. In the past, wall failure has occurred in such structures due to metal wastage by corrosion or oxidation. The wastage is increased by the attack of molten ash. The ash deposits, while still molten on the tube surface, cool and are removed by the corrosive environment. The ash deposits found downstream indicate that, when the ash and scale is eroded away, the tube metal is being lost incrementally along with corrosion products.

The total area to be coated measured approximately 81 square meters (871.4 square feet), including the 8 m (26.3 ft.) length of the waterwall, and the overhead wall.

The incinerator wall was prepared by blasting the surface with 40 mesh (420 μm) red aluminum oxide. A layer of superalloy thermal spray coating was applied using a flame combustion thermal gun, with a wire feedstock. The super- The superalloy coating was applied to the treatment area to a thickness of 600 μm (0.024 inches).

A slurry layer was deposited onto the thermal spray coating layer. The slurry layer was formed by depositing a commercially available slurry sold under the trade name Sermetel W (Sermatech International, Inc., Limerick, Pa.). The Sermetel W coating is comprised of aluminum powder, and aqueous material containing dissolved phosphate and dichromate, in accordance with the teachings of the Allen patent, previously noted.

No special preparation of the metallic layer was required prior to applying the slurry. The slurry was applied via spray painting techniques, with a wide application pattern. The slurry was cured by heating the combustion chamber area to a temperature of 260° C. (500° F.) for several hours with industrial space heaters. The slurry was applied to a thickness of approximately 50 to 70 μm.

The incinerator was then operated under normal conditions, and inspected after 6 months. The results of the inspection revealed the following:

1. On the upper zone of the of the waterwall (approximately the upper 2 m, or 6.56 feet), where the deposited ash typically exists in a molten or semi-molten state, thick deposit of ash was found on the tubes. In this region, the fume temperatures reach approximately 950–1070° C. (1742–1958° C.). On inspection, the slurry coating could not be detected. Nonetheless, under the ash deposit, the thermal metallic spray deposit showed no evidence of molten ash attack, and the thickness of the thermal spray deposit was not reduced by measurable quantities. It is believed that the aluminum pigment from the slurry diffused into the thermal spray layer, and the remaining ceramic matrix eroded from the surface.

Upon inspection after 6 months of use, the coated upper zone of Example 1 showed a surface deposit of ash, with no material loss of the thermal spray coating deposit beneath.

2. On the lower region of the waterwall, the slurry coating was still intact. There was no ash deposit. In this lower region, the fume and gas temperature is lower than 850° C. (1562° F.). Normally, when thermal metallic spray coating deposits alone have been used to coat the incinerator wall, the coating in the lower region exhibits disbanding, such as in corners or where tubes are welded together. Significantly, utilizing the coating method of the present invention, upon inspection after 6 months of use, there was no spalling of the coating in this region.

EXAMPLE 2

Within the same incinerator described in Example 1 above, a 1 square meter (10.8 square feet) section of the waterwall was sealed with a coating according to the method of the present invention as follows.

A phosphate bonded aluminum slurry was sprayed over a first layer of a wire sprayed thermal spray coating of IN625. The aluminum slurry used was substantially similar in composition to Example 2 of U.S. Pat. No. 5,478,413. As in Example 1, above, the slurry was cured by heating the incinerator chamber with industrial space heaters.

Upon inspection after 6 months of use, the coated region of Example 2 showed a surface deposit of ash, with no material loss of the thermal spray coating deposit beneath.

EXAMPLE 3

Another incinerator combustion chamber was coated as in Example 1, above. A thermal spray coating of IN625 was deposited using a combustion wire process, to a thickness of about 600 µm (0.024 inches). The thermal spray coating deposit was overcoated with an aluminum pigmented potassium silicate solution having about 55% nonvolatile content, with about 80% of the nonvolatile content being atomized aluminum powder of 5–6 µm average particle size. The slurry was applied via spraying and allowed to soak into the thermal spray coating deposit. Spraying of the slurry was continued until the surface was fully wet with coating.

The silicate coating was allowed to air set for 24 hours. The incinerator was then placed back into operation.

EXAMPLE 4

An incinerator combustion chamber with a waterwall tube arrangement similar to the chamber of Example 1 was coated with a thermal spray coating of IN625 alloy using an HVOF thermal spray coating process. The coating was applied to a thickness of 500–600 µm (0.020–0.024 inches). No slurry was sprayed over the thermal spray coating deposit.

After 12 months of operation the coating displayed distress and cracking in the scallop fillet areas. Significant disbonding was detected in areas of greater coating thickness, such as where numerous thermal spray coating passes had overlapped, and in difficult to reach areas, such as corners or overhead walls.

The coating was repaired by blasting the thermal spray coated surface with crushed nut shells to remove ash and ceramic products from the surface, followed by blasting with 60 mesh (250 µm) aluminum oxide to remove loose thermal spray coating particles.

In those areas where cracking was visible, IN625 was reapplied locally by combustion wire spraying.

A slurry as described in Example 1 was applied to the entire area having a thermal spray coating deposit and then cured by circulating hot water in the heat exchanger at a temperature of about 220° C. (428° F.).

EXAMPLE 5

Another section of an incinerator which would benefit from the coating method of the present invention is the superheater. The superheater section of a waste incinerator consists of a series of curved, spaced tubes. The superheater increases the temperature of water preheated at 260° C. (500° F.) in the waterwall up to about 550° C. (1022° F.) by exposing the water to additional downstream exhaust gases. The exhaust gases reach temperatures of 740° C. (1364° F.). Molten ash and mixed low temperature/high temperature hot corrosion produce tube failure due to erosion and corrosion.

The superheater tubes comprise low alloy steel and are usually replaced every 3 months. This incinerator plant undergoes a tube corrosion rate (loss of wall thickness) of approximately 2 mm/3 months in the superheater section.

Sections of the superheater tubes were coated using three different techniques. The first section was coated with Sermetel 725 (Sermatech International, Inc., Limerick, Pa.). Sermetel 725 comprises Sermetel W, an Allen-type aluminum-containing slurry described above, to which a ceramic sealer is applied. The Sermetel 725 was applied to a thickness of about 50–75 µm.

A second section was thermally sprayed by HVOF with Hastelloy® C-22, a nickel and chromium-containing superalloy.

A third section was wire sprayed with IN625, described above, and then coated with Sermetel 860 (Sermatech International, Inc., Limerick, Pa.), an Allen-type aluminum- and silicon-containing slurry, in accordance with the present invention. The Sermetel 860 was applied to a thickness of about 75 to 150 µm. The coating was cured, and then diffused by placing the coated section in a furnace and heating to about 860° C. (1600° F.) for about 2 hours under a flow of argon. After the 2 hour heating cycle, the temperature was lowered to <500° C., and the superheater section was cooled.

After 2 months the specimens were inspected. The section coated with Sermetel 725 alone was corroding at the expected rate for the steel. The section thermal sprayed with Hastelloy C-22 alone was reacting with oxide scale and beginning to show signs of distress.

Significantly, the section coated with IN625 and Sermetel 860 according to the present invention showed no signs of reaction, and no measurable coating loss.

It is understood that the present invention is not limited to the particular embodiments shown and described herein, but that various changes and modifications may be made without departing from the scope and spirit of the invention.

What is claimed is:

1. A method of coating a substrate comprising the steps of:
   a. depositing onto a substrate by thermal spraying a metallic layer, said metallic layer comprising at least about 8% nickel by weight, said metallic layer having an average density greater than about 80%; and
   b. depositing a slurry layer onto the metallic layer, said slurry layer comprising one or more diffusable aluminum-containing metallic pigments and one or more inorganic liquid binders, said slurry layer comprising from about 10% to about 90% aluminum or alloy thereof by weight.

2. The coating method of claim 1, wherein the slurry layer comprises from about 40% to about 80% aluminum or alloys thereof by weight.

3. The coating method of claim 2, wherein the slurry layer comprises from about 55% to about 70% aluminum or alloy thereof by weight.

4. The coating method of claim 1, wherein the metallic layer comprises an alloy comprising from about 20% to about 80% nickel by weight.

5. The coating method of claim 1, wherein the inorganic liquid binder is selected from the group consisting of acid phosphate/dichromates, acid phosphate/molybdates, acid phosphates, alkali silicates, lithium polysilicates, quaternary silicates, colloidal silica, alkyl silica, siloxanes, and combinations thereof.

6. The coating method of claim 1, further comprising the step of heating said metallic layer and said slurry layer to a temperature sufficient to result in the diffusion of aluminum from the slurry layer into the metallic layer and the formation of an intermetallic layer of NiAl on the surface of the metallic layer.

7. The coating method of claim 1, wherein the metallic layer further comprises at least about 12% chromium by weight.

8. The coating method of claim 2, wherein the metallic layer comprises from about 12% to about 25% chromium by weight.

9. The coating method of claim 1, wherein the substrate is a component of an incinerator.

10. A method of repairing a nickel-containing metallic layer which has seen deposited by thermal spraying, said metallic layer comprising at least about 8% nickel by weight, and having an average density greater than about 80%, the method comprising:

a. depositing a slurry layer onto the metallic layer, said slurry layer comprising one or more diffusable aluminum-containing metallic pigments and one or more inorganic liquid binders, said slurry layer comprising from about 10% to about 90% aluminum or alloy thereof by weight, and b. curing said slurry layer to form a coating on said nickel-containing metallic layer.

11. The coating method of claim 10, wherein the slurry layer comprises from about 40% to about 80% aluminum or alloy thereof by weight.

12. The coating method of claim 11, wherein the slurry layer comprises from about 55% to about 70% aluminum or alloy thereof by weight.

13. The coating method of claim 10, wherein the inorganic liquid binder is selected from the group consisting of acid phosphate/dichromates, acid phosphate/molybdates, acid phosphates, alkali silicates, lithium polysilicates, quaternary silicates, colloidal silica, alkyl silica, siloxanes, and combinations thereof.

14. The coating method of claim 10, further comprising the step of heating said metallic layer and said slurry layer to a temperature sufficient to result in the diffusion of aluminum from the slurry layer into the metallic layer and the formation of an intermetallic layer of NiAl on the surface of the metallic layer.

15. The coating method of claim 10, wherein the nickel-containing metallic layer which is repaired is contained within an incinerator.

* * * * *